United States Patent [19]

Ko

[11] Patent Number: 5,932,944
[45] Date of Patent: Aug. 3, 1999

[54] ELECTRIC MOTOR ASSEMBLY WITH BRAKING ARRANGEMENT

[76] Inventor: Kent Ko, No. 21-3, Feng-Shu Tsun, Kuei-Shan Hsiang, Tao-Yuan Hsien, Taiwan

[21] Appl. No.: 09/165,544

[22] Filed: Oct. 2, 1998

[51] Int. Cl.⁶ .................................................. H02K 7/10
[52] U.S. Cl. ................................. 310/77; 310/78; 310/93
[58] Field of Search .................................. 310/80, 83, 82, 310/75 R, 77, 93, 78; 74/10 R, 10.8, 640, 661, 721; 188/69

[56] References Cited

U.S. PATENT DOCUMENTS

| | | |
|---|---|---|
| 4,460,838 | 7/1984 | Ulicny . |
| 5,406,180 | 4/1995 | Feller, Jr. ................................. 318/372 |

*Primary Examiner*—Nestor Ramirez
*Assistant Examiner*—Saeed Ghahramani
*Attorney, Agent, or Firm*—Christensen O'Connor Johnson Kindness PLLC

[57] ABSTRACT

An electric motor assembly includes an output shaft with a fixed large gear, a driving shaft with a fixed small gear, a motor for rotating the driving shaft, and a gear box. The gear box includes a housing and a reduction gearing, which is disposed within the housing. The gearing includes a plurality of speed-reducing members, each of which includes a rotating shaft journalled in the housing, a large gear sleeved fixedly on the rotating shaft, and a small gear sleeved fixedly on the rotating shaft and with a tooth number and a diameter that are smaller than those of the large gear. The large gears of the output shaft and the speed-reducing members mesh respectively with the small gears of the driving shaft and the speed-reducing members. One of the large and small gears of the speed-reducing members has a side surface. A biasing unit biases an end of the driving shaft to press against the side surface, thereby stopping immediately rotation of all of the large and small gears once power to drive the motor is switched off.

7 Claims, 3 Drawing Sheets

1

ELECTRIC MOTOR ASSEMBLY WITH BRAKING ARRANGEMENT

BACKGROUND OF THE INVENTION

1. Field of the Invention

This invention relates to an electric motor assembly, more particularly to an electric motor assembly that has a braking arrangement to stop immediately rotation of the motor once power to drive the motor is switched off.

2. Description of the Related Art

The improvement of this invention is directed to a conventional electric motor with a braking arrangement, which is disclosed in U.S. Pat. No. 4,460,838 and which is illustrated in FIGS. 1 and 2. As illustrated, the conventional electric motor includes a rotor shaft 10, an armature assembly 11, a stop plate 12, a spring 13, a rotating clutch plate 14, and a pawl member 15. The rotating clutch plate 14 is rotatable with the rotor shaft 10. Normally, the armature assembly 11 is located at the position shown in FIG. 1. When power to drive the motor is switched on, a magnetic field is created to move the armature assembly 11 to the position shown in FIG. 2, in which a pawl portion 151 of the pawl member 15 is moved out of the rotational path of a lobe portion 141 of the rotating clutch plate 14. When the power to drive the motor is switched off, the spring 13 biases the armature assembly 11 back to the position shown in FIG. 1, in which the pawl portion 151 of the pawl member 15 extends through an aperture 120 in the stop plate 12 into the rotational path of the lobe portion 141 of the rotating clutch plate 14, thereby stopping rotation of the clutch plate 14 and the rotor shaft 10. The conventional electrical motor suffers from the following disadvantages:

(1) The engagement of the lobe portion 141 with the pawl portion 151 causes serious damage to engaging surfaces between the pawl member 15 and the rotating clutch plate 14 due to the rapid movement of the pawl member 15 from the position of FIG. 2 to that of FIG. 1. As a result, the pawl member 15 and the rotating clutch plate 14 might be struck to deform or even break.

(2) When the power to drive the motor is switched off, the rotor shaft 10 does not stop immediately, thereby resulting in inconvenience in use, e.g. for exerciser applications.

SUMMARY OF THE INVENTION

The object of this invention is to provide a durable electric motor, which has a braking arrangement to stop immediately the rotation of the motor once power to drive the motor is switched off.

According to this invention, an electric motor assembly includes an output shaft with a fixed large gear, a driving shaft with a fixed small gear, a motor for rotating the driving shaft, and a gear box. The gear box includes a housing and a reduction gearing, which is disposed within the housing. The gearing includes a plurality of speed-reducing members, each of which includes a rotating shaft journalled in the housing, a large gear sleeved fixedly on the rotating shaft, and a small gear sleeved fixedly on the rotating shaft and with a tooth number and a diameter that are smaller than those of the large gear. The large gears of the output shaft and the speed-reducing members mesh respectively with the small gears of the driving shaft and the speed-reducing members. One of the large and small gears of the speed-reducing members has a side surface. A biasing unit biases an end of the driving shaft to press against the side surface, thereby stopping immediately rotation of all of the large and small gears once power to drive the motor is switched off.

BRIEF DESCRIPTION OF THE DRAWINGS

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
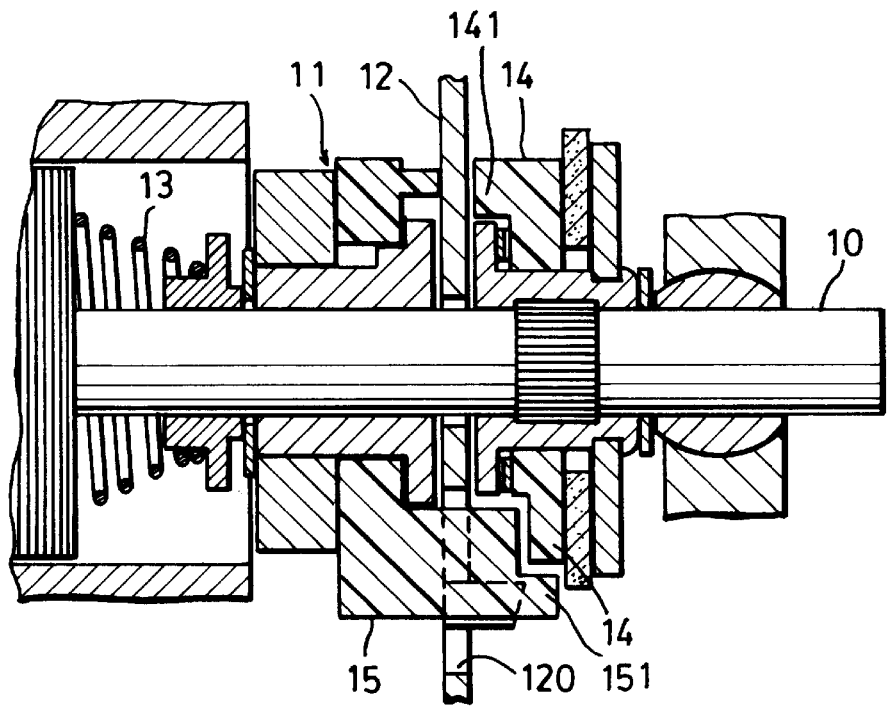
FIG. 1 is a sectional view of a conventional electric motor assembly in an idle state.
Figure 2:
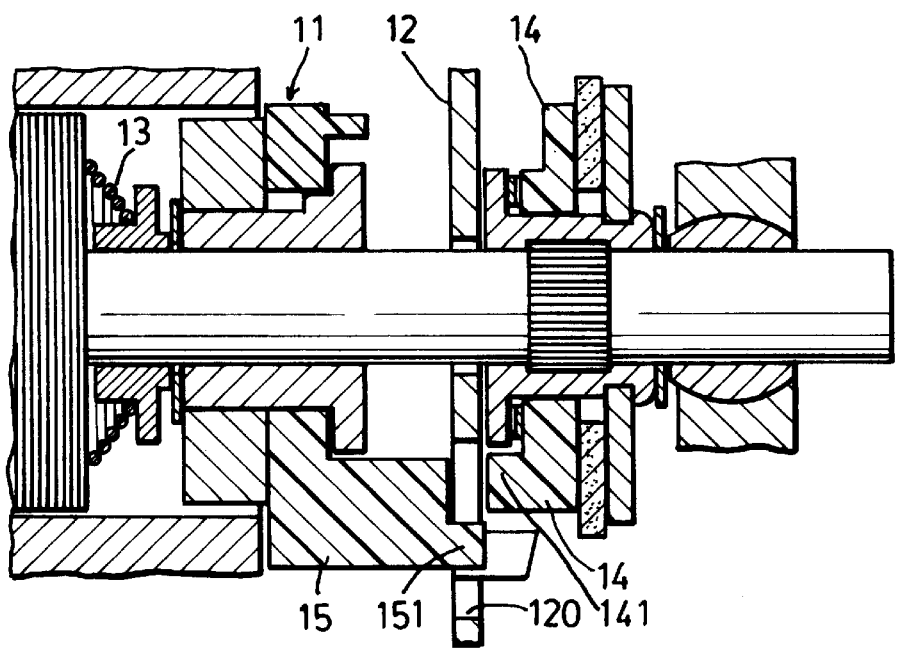
FIG. 2 is a sectional view of the conventional electric motor assembly in a running state.
Figure 3:
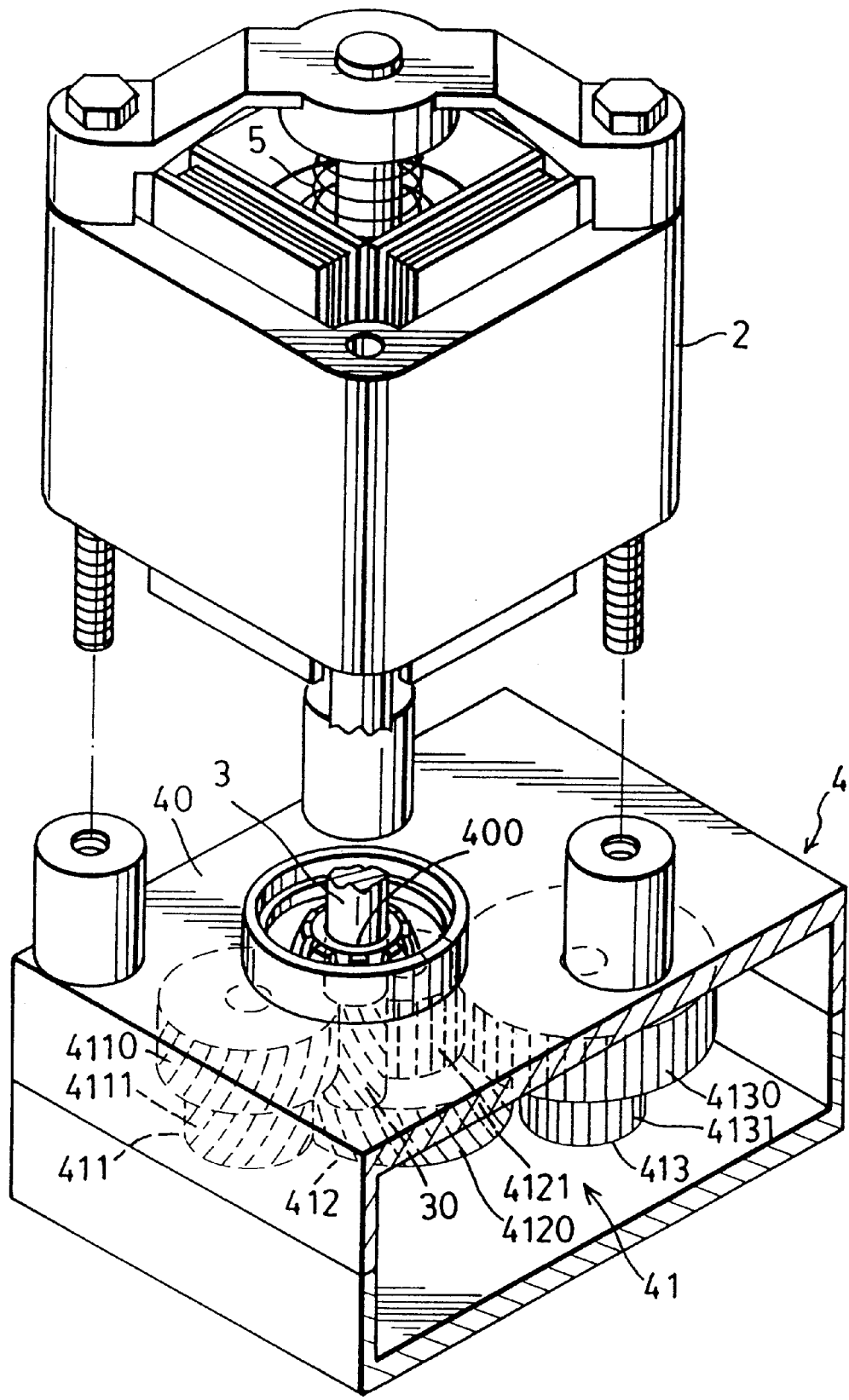
FIG. 3 is a partly exploded perspective view of the preferred embodiment of an electric motor assembly according to this invention.
Figure 4:
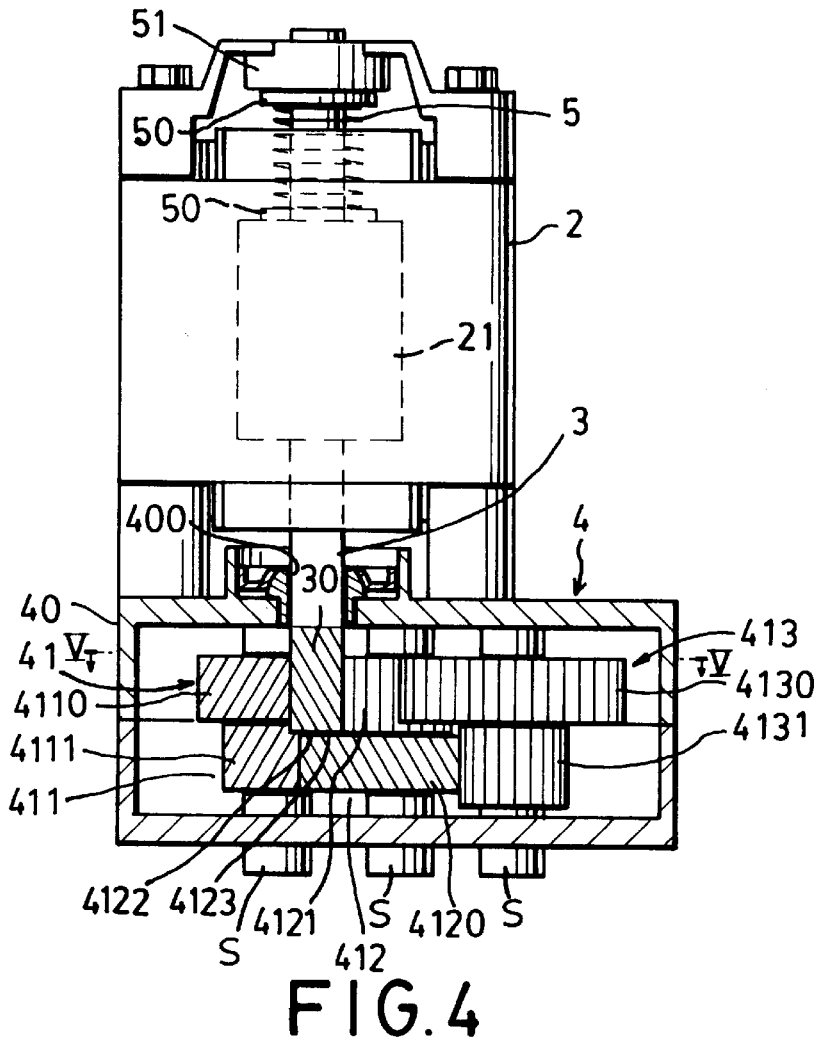
FIG. 4 is a vertical, partially sectional view taken through a portion of the electric motor assembly of FIG. 3.
Figure 5:
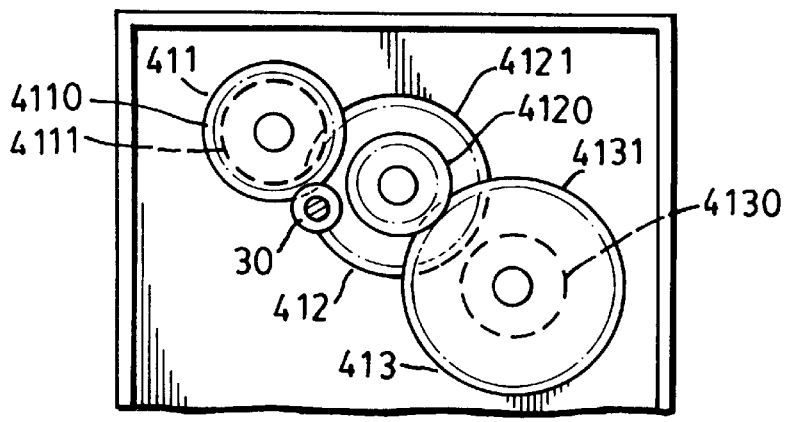
FIG. 5 is a sectional view taken along line V—V in FIG. 4.

Referring to FIGS. 3 to 5, the preferred embodiment of an electric motor assembly according to this invention is shown to include a motor 2, a driving shaft 3, a gear box 4, and a coiled compression spring 5 which acts as a biasing unit.

The motor 2 has a rotor 21, which is fixed on the driving shaft 3.

In this embodiment, the driving shaft 3 is a motor shaft of the motor 2, and includes a small gear 30, which is sleeved fixedly thereon and which is shaped as a bevel gear.

The gear box 4 has a housing 40 and a reduction gearing 41, which is disposed within the housing 40 and which includes a unitary first speed-reducing member 411, a unitary second speed-reducing member 412, and a unitary output shaft 413. The housing 40 has an aperture 400, through which the driving shaft 3 extends. Each of the speed-reducing members 411, 412 and the outer shaft 413 is made of plastic steel or high-strength plastics, and has a rotating shaft (S) journalled in the housing 40, a large gear 4110, 4120, 4130 sleeved fixedly on the rotating shaft (S), and a small gear 4111, 4121, 4131 sleeved fixedly on the rotating shaft (S) and with a tooth number and a diameter that are smaller than those of the large gear 4110, 4120, 4130. A metal ring plate 4123 is secured to a side surface 4122 of the large gear 4120 of the second speed-reducing member 412. The gears 4110, 4111 and 4120 are bevel gears. Two washers 50 are sleeved on the driving shaft 3 between the rotor 21 and a bearing member 51, which is disposed in the motor 2 and which has the driving shaft 3 journalled thereon. The compression spring 5 is sleeved on the driving shaft 3 between the washers 50 so as to bias an end of the driving shaft 3 to press against the metal ring plate 4123, which is secured to the large gear 4120 of the second speed-reducing member 412, thereby stopping immediately the rotation of the large gear 4120 once power to drive the motor 2 is switched off.

To rotate the output shaft 413 at a speed smaller than the driving shaft 3, in the gear box 4, the small gear 30 of the driving shaft 3 meshes with the large gear 4110 of the first speed-reducing member 411, the small gear 4111 of the first speed-reducing member 411 meshes with the large gear 4120 of the second speed-reducing member 412, and the small gear 4121 of the second speed-reducing member 412 meshes with the large gear 4130 of the output shaft 413. As such, it is necessary for the motor 2 to provide a relatively large torque in order to rotate the speed-reducing members 411, 412 and the output shaft 413. Accordingly, after the power to drive the motor 2 is switched off, a torque created by limited rotation of the driving shaft 3 cannot overcome the pressure of the driving shaft 3 against the large gear 4120 of the second speed-reducing member 412, thereby stopping immediately the rotation of the driving shaft 3.

With this invention thus explained, it is apparent that numerous modifications and variations can be made without departing from the spirit and scope of this invention. It is therefore intended that this invention be limited only as indicated in the appended claims.

I claim:

1. An electric motor assembly comprising:

an output shaft including a large gear, which is sleeved fixedly thereon;

a driving shaft including a small gear, which is sleeved fixedly thereon;

a motor rotating said driving shaft;

a gear box including a housing and a reduction gearing which is disposed within said housing, said gearing including a plurality of speed-reducing members, each of said speed-reducing members including a rotating shaft journalled in said housing, a large gear sleeved fixedly on said rotating shaft, and a small gear which is sleeved fixedly on said rotating shaft and which has a tooth number and a diameter that are smaller than those of said large gear, said large gears of said output shaft and said speed-reducing members meshing respectively with said small gears of said driving shaft and said speed-reducing members, one of said large and small gears of said speed-reducing members having a side surface; and a biasing unit biasing an end of said driving shaft to press against said side surface, thereby stopping immediately rotation of all of said large and small gears once power to drive said motor is switched off.

2. An electric motor assembly as claimed in claim 1, wherein said motor has a motor shaft, which constitutes said driving shaft.

3. An electric motor assembly as claimed in claim 2, further comprising a bearing member mounted on said housing to journal said motor shaft thereon, said motor having a rotor, which is fixed on said motor shaft, said biasing unit including a coiled compression spring, which is sleeved on said motor shaft between said bearing member and said rotor.

4. An electric motor assembly as claimed in claim 1, wherein said small gear of said driving shaft is a bevel gear.

5. An electric motor assembly as claimed in claim 1, wherein each of said speed-reducing members is unitary, and is made of plastic steel.

6. An electric motor assembly as claimed in claim 1, wherein each of said speed-reducing members is unitary, and is made of plastic.

7. An electric motor assembly as claimed in claim 1, wherein said side surface is provided with a metal ring plate, which is secured thereto, said end of said driving shaft pressing against said metal ring plate.

* * * * *